United States Patent [19]

Stockman

[11] 4,312,027
[45] Jan. 19, 1982

[54] MULTIPLE CAPACITOR WINDING WITH ELECTROSTATIC SHIELDING

[75] Inventor: Robert M. Stockman, Brookfield Center, Conn.

[73] Assignee: American Radionic Co., Inc., Danbury, Conn.

[21] Appl. No.: 170,893

[22] Filed: Jul. 21, 1980

[51] Int. Cl.³ .............................................. H01G 4/38
[52] U.S. Cl. .................................. 361/329; 29/25.42; 361/275; 361/328
[58] Field of Search ............... 361/275, 328, 329, 330; 29/25.42

[56] References Cited

U.S. PATENT DOCUMENTS

| | | | |
|---|---|---|---|
| 1,658,501 | 2/1928 | Valle | 361/328 |
| 2,960,561 | 11/1960 | Plummer | 174/36 |
| 3,921,041 | 11/1975 | Stockman | 361/330 |

*Primary Examiner*—Elliot A. Goldberg
*Attorney, Agent, or Firm*—Parmelee, Johnson, Bollinger & Bramblett

[57] ABSTRACT

Multiple capacitors wound from two thin metallized dielectric films on a common core are provided with electrostatic shielding therebetween. A first capacitor is wound in the usual manner using two metallized films. After the winding of the first capacitor, the metallized layers are removed from the first and second metallized films over predetermined intermediate regions of the films. A film of insulating material and a metal shielding layer are then wound between the first and second films with the insulating material and the metal shielding layer extending outwardly from one end of the cylindrical form. The film of insulating material and the metal shielding layer are wound to encircle the capacitor at least once, with the film of insulation material encircling the metal shielding layer on each side thereof. After the metal shielding layer has been wound, the winding of the first and second metallized films is completed to form a second capacitor on the first capacitor. The ends of the capacitors so wound are metal coated and electrical connections are made to the first and second capacitors on the coated ends thereof. An electrical connection is also made to the shielding layer within the barrier formed by the film of insulation material.

2 Claims, 5 Drawing Figures

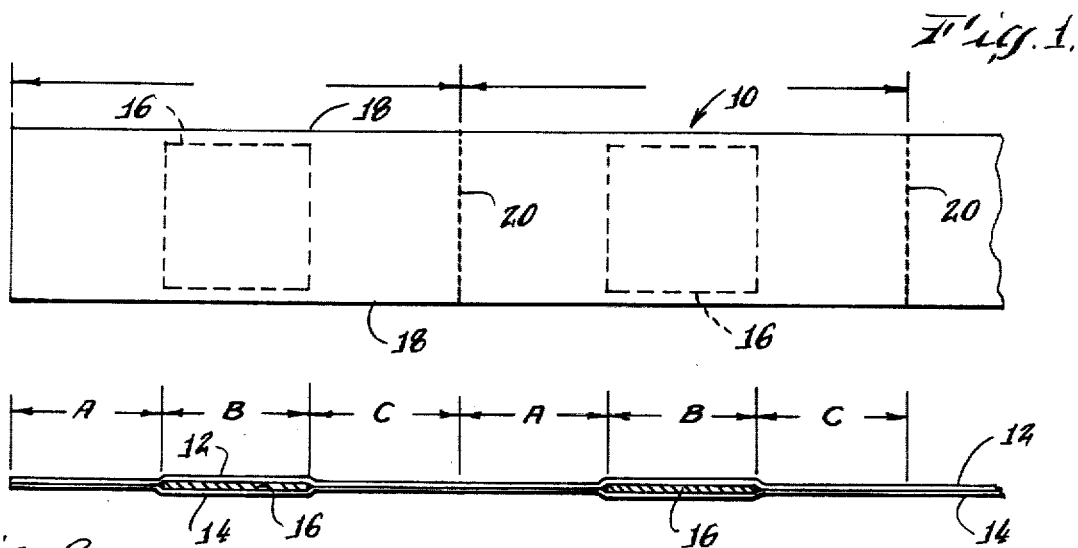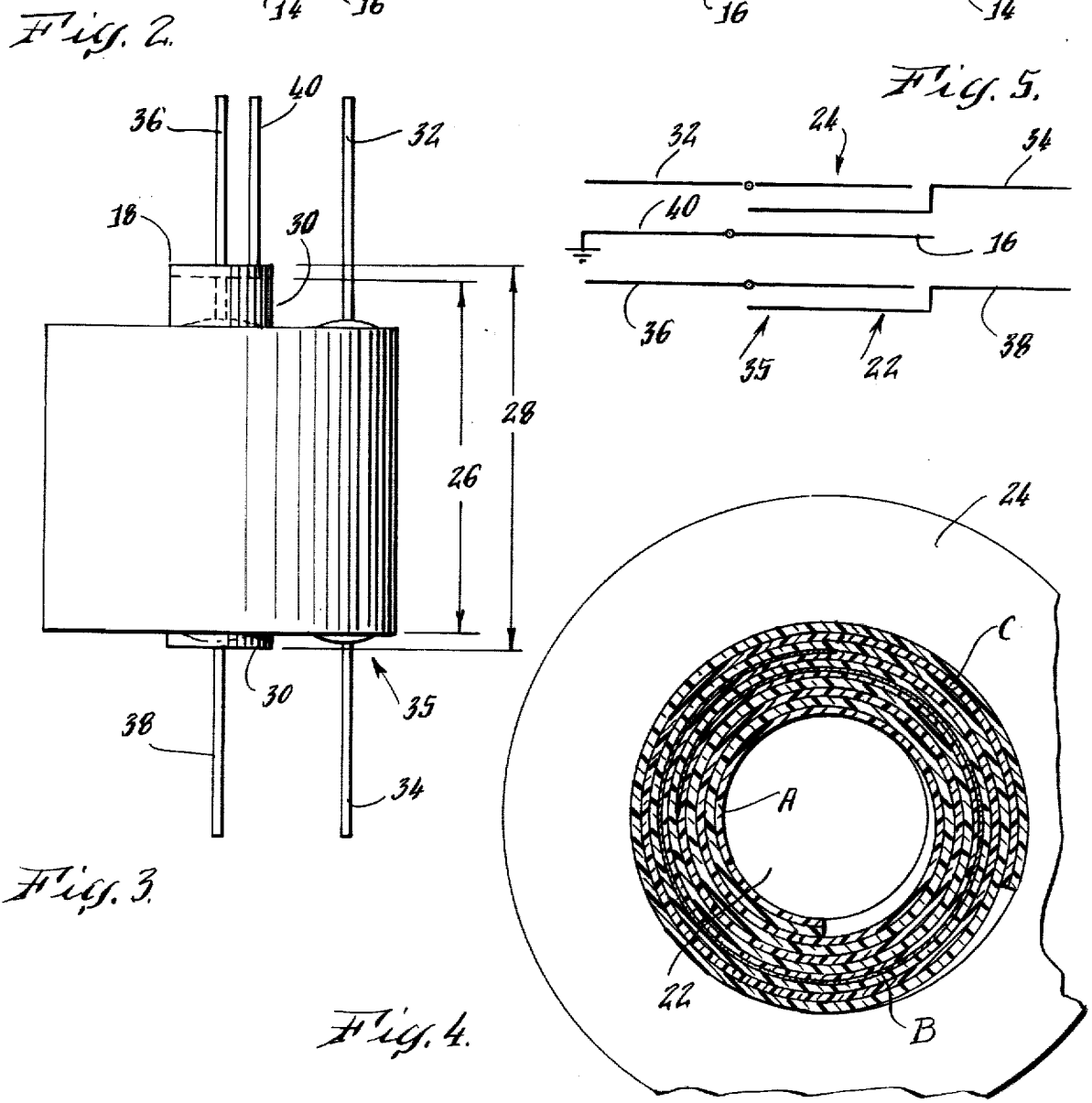

MULTIPLE CAPACITOR WINDING WITH ELECTROSTATIC SHIELDING

BACKGROUND OF THE INVENTION

This invention relates to metallized film wound capacitors and, more particularly, to the winding of a plurality of these capacitors with electrostatic shields separating the capacitors.

Among the advantages of making capacitors of metallized dielectric film is that such capacitors lend themselves to mass production techniques and make possible the winding of more than one capacitor on a single core. This permits making more compact capacitors than would be the case if a number of separate capacitors were employed. However, for some applications, it is necessary to prevent interaction between various capacitors in the circuits in which they are employed. This requires some form of electrostatic shielding.

SUMMARY OF THE INVENTION

It is an object of this invention to provide two or more capacitors which are wound on a single core and are electrostatically shielded from each other.

A further object of this invention is to provide a new and improved method of making multiple metallized film capacitors with electrostatic shielding utilizing mass production techniques which is less expensive than providing separate capacitors and shielding them from each other.

In carrying out this invention, in one illustrative embodiment thereof, a capacitor and a method of making the same are provided in which a multiple element metallized film capacitor has electrostatic shielding between the capacitors therein. First and second metallized dielectric films are wound in substantially cylindrical form with the non-metallized side of each film in contact with the metallized side of the other film. The metallized edge of the first metallized film is exposed at one end of the cylindrical form and the metallized edge of the second metallized film is exposed at the other end of the cylindrical form. A first capacitor is thereby formed. The metallized layer of each of the first and second metallized films is then removed over predetermined intermediate regions thereof. A film of insulating material and a metal shielding layer are wound between the first and second metallized films and extend outwardly from one end of the cylindrical form. The film of insulating material and the metal shielding layer are wound to encircle the first capacitor at least once with the film insulating material encircling each end of the metal shielding layer at least once. The winding of the first and second metallized films is then completed to form a second capacitor around the first capacitor. The ends of the cylindrical form are metal coated and electrical connections are made to the coated ends of the first and second capacitors. An electrical connection is also made to the metal shielding layer, which may be grounded to provide electrostatic shielding between the first and second capacitors.

A film of insulation material and the metal shielding layer may be a unitary film of two layers of insulating material having a metal foil sandwiched therebetween. As an alternative, metal may be removed on two sides of one of the metallized layers to form a metal shielding layer and then surrounded on each end thereof by insulating material to isolate it from the first and second capacitors and to provide a shielding means.

Advantageously, this permits the winding of two or more capacitors in the same winding process on the same core which are electrostatically shielded from each other. The shielding may be provided without disrupting the winding process and at much less expense than would be the case in providing two separate capacitors which are shielded from each other.

BRIEF DESCRIPTION OF THE DRAWINGS

The invention, together with further aspects, objects, features and advantages thereof will be more clearly understood from the following description taken in conjunction with the accompanying drawings.

FIG. 1 is a plan view illustrating one type of insert in the form of metal shielding layers sandwiched between two insulating layers, which insert is wound between two capacitors for forming an electrostatic shield therebetween as embodied in the present invention.

FIG. 2 is a side elevational view of the insert illustrated in FIG. 1.

FIG. 3 is a side view of a completed multiple element capacitor having an electrostatic shield between capacitors in accordance with the present invention.

FIG. 4 is an enlarged cross-sectional view of FIG. 3 illustrating the use of the insert of FIG. 1.

FIG. 5 is an electrical schematic diagram of the capacitor which was wound in FIG. 3.

DESCRIPTION OF THE PREFERRED EMBODIMENTS

The present inventor's U.S. Pat. No. 3,921,041 describes a method of making a dual metallized film capacitor by winding two metallized dielectric films in cylindrical form to form two capacitor values on a common core. Since the present invention involves similar winding techniques, the winding apparatus and the two metallized films will not be described in detail, but only generally. In winding the first and second metallized films in substantially cylindrical form, the non-metallized side of one film is in contact with the metallized side of the other film. The metallized edge of the first metallized film is exposed at one end of the cylindrical form while the metallized edge of the second metallized film is exposed at the other end of the form. The exposure of these metallized edges permits the metal coating of the edges of the capacitor in order to make electrical connections thereto.

In accordance with an embodiment of the present invention, after the first and second metallized films are wound to form a first capacitor the metallized layers on each of the first and second metallized films are removed in a region intermediate the ends of the first and second films. The exact location of the removal will depend on the size of the capacitors being wound. For example, if the first capacitor and the second capacitor are to have the same values, then the metallized layers on the two films would be removed near the center of each film. After the removal of the two metallized layers from the first and second films, a shielding barrier, referred to generally with the reference character 10, as seen in FIG. 1, is inserted between the first and second dielectric films where the metallized layers have been removed.

The shielding barrier 10 comprises, as is best illustrated in FIG. 2, two insulating films in the form of an upper insulating film 12 and a lower insulating film 14 and a metal layer or foil 16 sandwiched therebetween. Segment A of the shielding barrier 10 comprises two insulating layers 12 and 14 while segment B includes the two insulating layers 12 and 14 having the metal foil 16 sandwiched therebetween, and segment C again is comprised of the two insulating layers 12 and 14. The relative lengths of the segments A, B and C are approximately the same as illustrated, but they may have different lengths as long as each segment is long enough to encircle, at least once, the first capacitor which has been wound in the winding process. The purpose of this, of course, is to isolate the first capacitor, which has already been wound, from the metallized shielding layer 16 and to isolate the second capacitor, which will be wound on top of the shielding barrier 10, from the metal shielding layer 16. In such a manner, the capacitors being wound are totally separated and isolated with a shielding barrier 16 positioned therebetween which provides an electrostatic shield between the capacitors. The edges 18 of the shielding barrier are fused along the entire insert. If in fact the shielding barrier is fed from a continuous strip, then the strip is cut along the lines 20 to provide a multiplicity of shielding barriers comprising segments A, B, and C.

As is illustrated in FIG. 4, a first capacitor 22 is first wound in cylindrical form as illustrated in the aforesaid patent, and then the metallized layers are removed from the two metallized films. At this point in the winding process, the shielding barrier 10 is inserted between the two layers which have been demetallized. All of the layers have not been illustrated in FIG. 4 for ease of illustration. As will be seen, segment A of the shielding barrier 10 is first wound around capacitor 22, followed by segment B which includes the metal shielding layer 16. After segment B has encircled capacitor 22, segment C follows. At the end of segment C, a second capacitor 24 is wound using the two metallized films as in the winding of capacitor 22.

FIG. 3 illustrates the completed capacitor. As will be seen in FIG. 3, the dimension 26 represents the width of the metal shielding layer 16. The metal shielding layer 16 extends the entire length of the capacitors 22 and 24 in order to provide shielding therebetween. The metal shielding layer also protrudes, along with the shielding barrier 10, beyond one edge of the completed capacitors in order that an electrical connection may be made thereto. The shielding barrier dimension 28 is such that the b ·ier 30 formed by the winding of the shielding barri... 10 protrudes out of both ends or edges of the wound capacitor. The barrier 30 not only isolates the metal shielding layer 16 but also isolates capacitor 22 from capacitor 24. Multiple capacitor 35 is then end sprayed with a metal coating and leads 32 and 34 are connected to opposite edges of the two metallized films forming the capacitor 24. Electrical leads 36 and 38 are also attached in conventional manner inside the barrier 30 to the capacitor 22. The fused edges 18 of the shielding barrier 10 may then be cut off or otherwise removed so that electrical connection 40 may be made to the metal shielding layer 16.

As will be seen in the electrical schematic diagram illustrated in FIG. 5, the multiple capacitor 35 includes an inner capacitor 22 and an outer capacitor 24 separated by an electrostatic metal shielding layer 16 whose electrical connection 40 is grounded. The encircling shield 16 eliminates or minimizes electrical coupling between the inner and outer capacitors 22 and 24, respectively.

It will be apparent to those skilled in the art that multiple value capacitors may be wound in the same manner as set forth in the aforesaid patent and may be shielded from each other in the manner taught by the present invention. The dual capacitors 22 and 24 which are illustrated in the present invention were utilized to explain the invention in its simplest manner, but the invention is not considered restricted thereto.

Another embodiment for providing shielding between two capacitors formed on a common core, using the same winding process, would be to use a portion of one of the metallized layers as the metal shielding layer. In other words, the capacitor 22 is first wound, and then the metallized layer of one of the two films is completely removed for a predetermined distance. The other metallized layer has portions removed on either side of a metal layer which forms the metal shielding layer in accordance with the present invention. As winding is continued, an insulating sheet of dielectric material may be inserted both before and after the metal shielding layer to form an isolation barrier. The shielding layer on one of the films may have a tab inserted to contact the metal shielding layer in order to make an electrical connection to the shield so formed. The process is completed by winding the second capacitor, end spraying the completed capacitor, and making electrical connections thereto in the conventional manner. As in the case with the first embodiment, the metal shielding layer must encircle the first capacitor at least once and the insulating layer must surround the capacitor at least once both before and after the metal shielding layer in order to isolate that layer from the two capacitors.

Since other changes and modifications varied to fit particular operating requirements and environments will be apparent to those skilled in the art, the invention is not considered limited to the examples chosen for purpose of illustration, and covers all changes and modifications which do not constitute a departure from the true spirit and scope of this invention.

What is claimed is:

1. The method of making a multiple element metallized film capacitor comprising two capacitors from first and second metallized films each having a metallized side and a non-metallized side and having electrostatic shielding between the capacitors using a third composite film comprised of a first segment of insulating material, a second segment of a metal shielding layer sandwiched between insulation material followed by a third segment of insulating material comprising the steps of:

winding said first and second metallized films in substantially cylindrical form with the non-metallized side of one film in contact with the metallized side cf the other film, and the metallized edge of said first metallized film being exposed at one end of said cylindrical form and the metallized edge of said second metallized film exposed at the other end of said cylindrical form to form a first capacitor;

removing the metallized layers from said first and second metallized films over predetermined intermediate regions on said films;

winding said third composite film on said first capacitor between said first and second metallized films in said intermediate region such that said third composite film extends outwardly from one end of said cylindrical form;

said metal shielding layer of said third composite film being wound to encircle said first capacitor at least once;

said first and third segments of said third composite film being wound to encircle said metal shielding layer at least once on each side of said metal shielding layer forming an insulating barrier on each side thereof;

completing the winding of said first and second metallized film to form a second capacitor on said cylindrical form;

coating the ends of said cylindrical form with metal;

making electrical connections to said first and second capacitors on the coated ends thereof; and making an electrical connection to said metal shielding layer within said insulating barrier.

2. A multiple element thin film capacitor having electrostatic shielding between multiple element capacitors comprising:

a first capacitor wound from first and second metallized dielectric films each having a metallized side and a non-metallized dielectric side with the metallized side of each film contacting the dielectric side of the other film, and the metallized layers of said first and second films extending to opposite ends of said first capacitor;

a non-metallized region on said first and second metallized films;

a third composite film having a metallized region encircling said first capacitor at least once, forming an electrostatic shield;

said third composite film including insulating means preceding and succeeding said shield which form a barrier on each side of said electrostatic shield which encircles said first capacitor and said shield at least once and isolates said shield from said first capacitor;

a second capacitor wound from said first and second metallized dielectric films over said first capacitor, said electrostatic shield and said barriers on each side of said electrostatic shield;

means for making electrical connections to said first and second capacitors on the edges of said capacitor; and means for making an electrical connection to said electrostatic shield between said barriers for electrostatically isolating said first and second capacitors.

* * * * *